F. H. COATES.
ATTACHMENT FOR CULTIVATORS.
APPLICATION FILED MAR. 23, 1912.
1,048,040.
Patented Dec. 24, 1912.
2 SHEETS—SHEET 1.
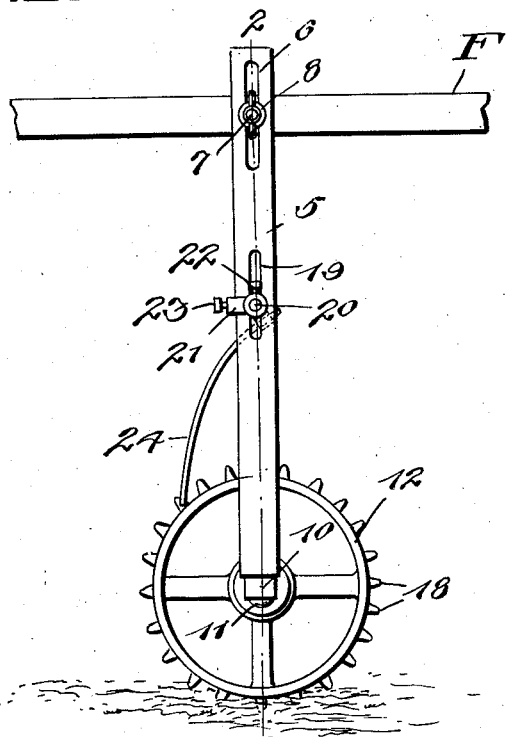
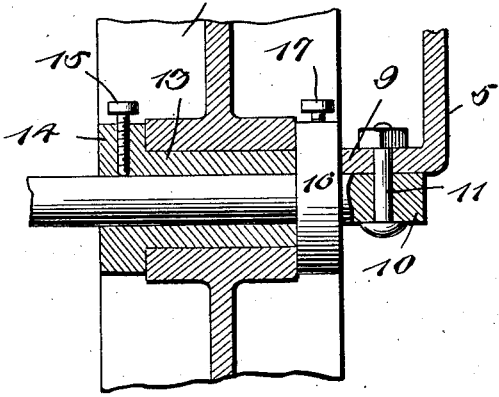
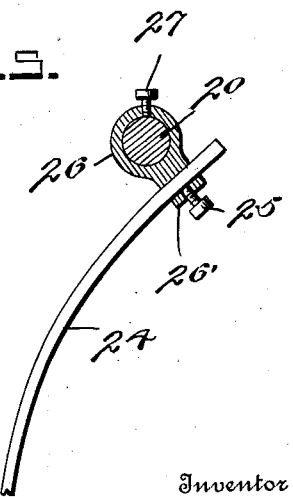
Inventor
F. H. Coates,
By Watson E. Coleman.
Attorney
Witnesses

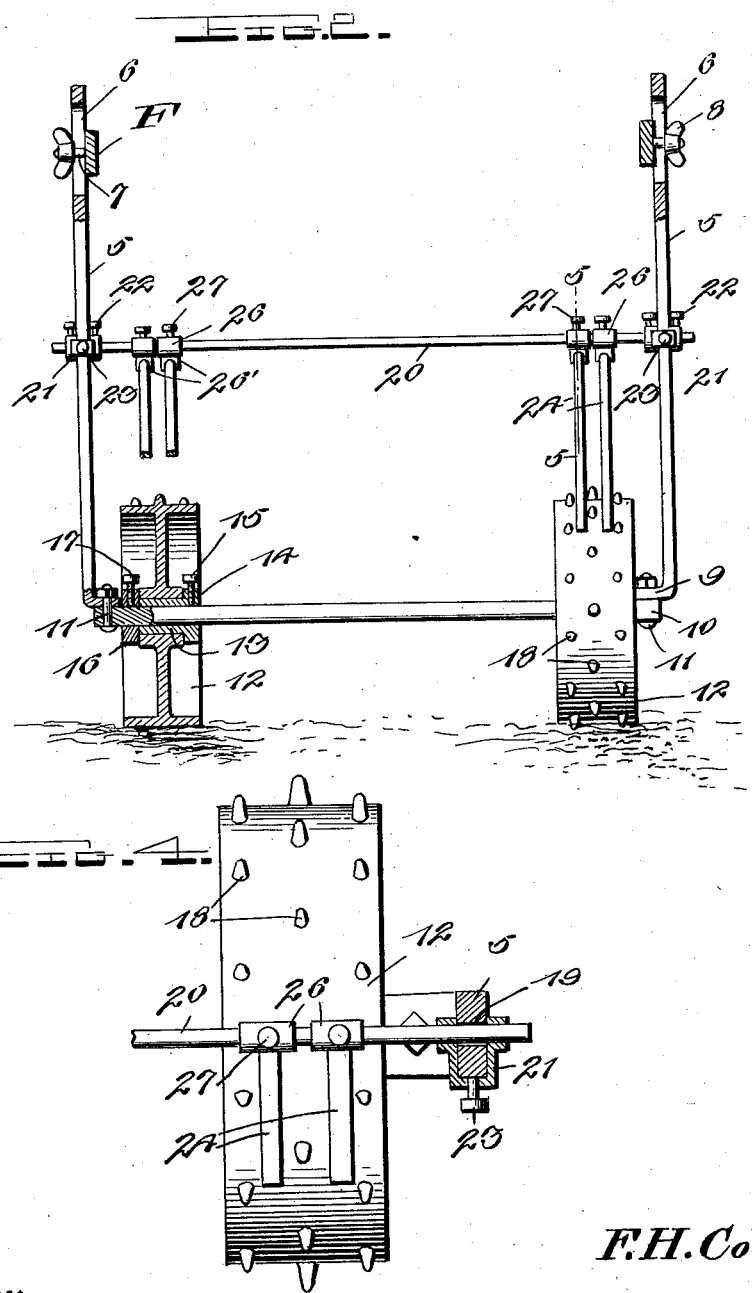

UNITED STATES PATENT OFFICE.

FORBES H. COATES, OF MEAD, COLORADO.

ATTACHMENT FOR CULTIVATORS.

1,048,040.  Specification of Letters Patent.  Patented Dec. 24, 1912.

Application filed March 23, 1912. Serial No. 685,736.

*To all whom it may concern:*

Be it known that I, FORBES H. COATES, a citizen of the United States, residing at Mead, in the county of Weld and State of Colorado, have invented certain new and useful Improvements in Attachments for Cultivators, of which the following is a specification, reference being had to the accompanying drawings.

This invention relates to an attachment for cultivators and has for its object to provide simple and efficient means whereby the hard crust or upper layer of soil which forms over the plowed surface of the ground after the seeds have been planted, may be broken or penetrated without injury to the immature plants, thus permitting the young plants to sprout and affording air to the seed root to facilitate the growth of the plant.

A further and more specific object of the invention resides in the provision of a roller rotatably mounted upon a transverse shaft supported in the frame of the cultivator, said roller being provided upon its periphery with a plurality of obliquely disposed spikes or spurs which are adapted to penetrate the upper layer of soil in the movement of the cultivator over the ground.

A further object of the invention resides in the provision of adjustable scraping blades and means for mounting the same to regulate the pressure of the blades upon the periphery of the roller.

With the above and other objects in view, the invention consists of the novel features of construction, combination and arrangement of parts hereinafter fully described and claimed, and illustrated in the accompanying drawings, in which—

Figure 1 is a side elevation of my improved soil breaking attachment mounted in the forward end of the frame of a cultivator; Fig. 2 is a section taken on the line 2—2 of Fig. 1, one of the soil breaking rollers being in elevation. Fig. 3 is an enlarged detail section showing the mounting of the rollers. Fig. 4 is a horizontal section through the vertical shaft supporting bar showing the roller in plan; and Fig. 5 is a section taken on the line 5—5 of Fig. 2.

Referring in detail to the drawing 5 designates a vertical bar, a pair of which are provided and adjustably mounted upon the side bars of the cultivator frame at their forward ends, said frame being indicated by the letter F. The upper ends of the bars 5 are provided with the longitudinal slots 6 to receive the threaded studs or bolts 7 fixed to the frame bars. Clamping nuts 8 are engaged upon said studs to securely clamp the bars 5 in their adjusted positions upon the frame. The lower ends of the bars 5 are angularly and inwardly disposed as shown at 9 and to the same the ends of a transversely extending shaft or axle 10 are rigidly fixed by means of the bolts 11.

The earth breaking rollers 12 are rotatably mounted upon the sleeves or bushing 13 which are longitudinally adjustable upon the axle 10. One end of the sleeve 13 is provided with a flange 14 in which a set screw 15 is secured which is adapted for binding engagement upon the axle to secure the sleeve or bushing in its adjusted position. A collar 16 is mounted upon the axle 10 for engagement with the other end of said sleeve and with the hub of the roller 12, said collar being rigidly fixed in position by means of a set screw 17. By mounting the wheels in this manner, it will be readily seen that they may be adjusted toward or from each other upon the axle 10 in accordance with the width of the plant row. It will be obvious that any desired number of the wheels or rollers 12 may be mounted upon the axle so as to break up the hard crust or upper soil directly over the plants and at either side of the row.

The periphery of the earth breaking roller 12 has formed thereon a plurality of obliquely arranged series of conical spurs or projections 18 which are adapted to penetrate the soil crust. It will be obvious that by simply adjusting the vertical axle carrying bars 5, the depth to which these spurs will penetrate the surface of the ground may be regulated as desired.

The shaft supporting bars 5 are also provided intermediate of their ends with the additional longitudinally extending slots 19. These slots receive the ends of a transverse bar or rod 20 and upon each end of this rod the ends of the U-shaped clamping clips 21 are removably secured by means of set screws 22, the parallel arms of said clips extending upon opposite sides of the vertical bars 5. A clamping screw 23 is threaded in the intermediate portion of the clip and engages the edge of the clamping bar to frictionally bind the end of the rod 20 against the wall of the slot 19 thereby securing said rod in its adjusted position in the slots of the shaft supporting bars. Upon the rod 20 a pair of spring arms 24 are adjustably arranged, one pair of said arms being provided for each of the ground rollers 12. These arms at one of their ends have scraping engagement with the periphery of the ground roller between the several annular rows of spurs thereon, the other ends of said arms being rigidly fixed by means of the screws 25 in an apertured lug 26' formed upon the sleeves 26 which are longitudinally adjustable upon the rod 20. Set screws 27 carried by the sleeves or collars 26 secure the same in their adjusted positions on said rods. By mounting the rod 20 adjustably in the vertical bars or uprights 5, the pressure of the scraping arms 24 at their free ends upon the periphery of the roller 12 may be varied as necessitated by the condition of the soil. Thus the surface of the roller between the spurs or projection 18 may be at all times kept free of accumulations of earth so that the spurs will penetrate the upper surface of the soil to the desired depth.

From the foregoing it is believed that the construction and arrangement of the several parts and the manner in which the same operate will be clearly understood.

The device may be readily arranged upon cultivators now in general use, and is extremely efficient and serviceable in actual operation. I have found such a device highly desirable in the cultivation of the sugar beet which is extremely delicate and sensitive, the young plants being easily killed in their effort to break through the hard crust of the soil. Earth breaking devices now employed to remedy such conditions dig up and destroy the young plants in large quantities, and it is with a view to overcoming such deficiencies in prior machines that the present invention is devised. By means of the adjustable feature of the rollers, they may be readily positioned so that the spurs thereon will not penetrate too deeply into the soil but only sufficiently to break the surface thereof so that the young plants may obtain air and readily force their way upwardly through the soil.

It will of course be obvious that the invention is not limited in its practical uses to the specific arrangement of the spurs upon the periphery of the roller, such arrangement as shown in the drawing being capable of considerable variation. These and other modifications in the form, proportion and arrangement of the parts may be resorted to in carrying out the principles of the invention without sacrificing any of the advantages or departing from the scope of the claims.

Having thus described the invention what is claimed is:—

1. In combination with a wheeled frame, depending vertically adjustable bars mounted on the frame, a shaft fixed at its ends to the lower ends of said bars, a plurality of earth breaking rollers revolubly mounted upon the shaft and having peripheral projections, means for adjusting the rollers longitudinally on the shaft, a rod mounted at its ends in said vertical bars, spring scraping arms longitudinally adjustable on the rod and bearing at one of their ends upon the periphery of the rollers, and means for regulating the pressure of said arms upon the rollers.

2. In combination with a wheeled frame, depending bars secured to opposite sides of the frame, a shaft fixed at its ends to the lower ends of said bars, a plurality of earth breaking rollers revolubly mounted on the shaft, a rod arranged between said bars, spring scraping arms longitudinally adjustable on said rod and bearing upon the rollers at their free ends, and means for adjusting said rod vertically to regulate the pressure of the scraping arms upon the rollers.

3. In combination with a wheeled frame, depending vertically adjustable bars mounted upon opposite sides of the frame, a shaft fixed at its ends to said bars, a plurality of rollers revolubly mounted upon said shaft and provided upon their peripheries with spaced annular series of spurs, means for longitudinally adjusting said rollers upon the shaft, said depending bars being provided with vertical slots, a rod having its ends disposed in said slots, clamping members movable upon the vertical bars to rigidly clamp the ends of the rod against movement in the slots to secure the rod in its adjusted position, longitudinally adjustable collars mounted upon said rod, and spring scraping arms adjustably secured to the collars and bearing at their free ends upon the peripheries of the rollers between the annular series of projections thereon.

In testimony whereof I hereunto affix my signature in the presence of two witnesses.

FORBES H. COATES.

Witnesses:
C. W. MICHAEL,
D. W. OLDFATHEN.

Copies of this patent may be obtained for five cents each, by addressing the "Commissioner of Patents, Washington, D. C."